UNITED STATES PATENT OFFICE.

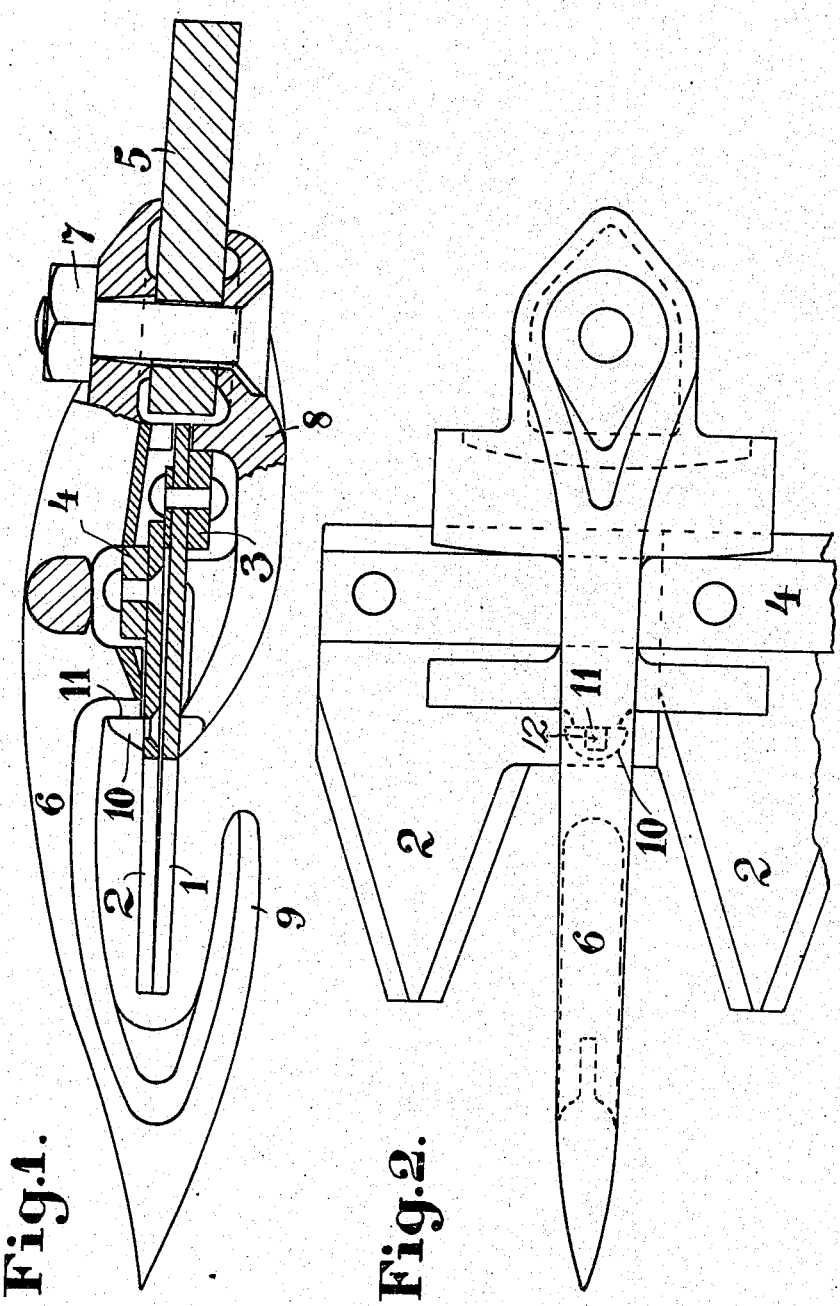

HANS CHRISTIAN BJERING, OF GJÖVIK, NORWAY, ASSIGNOR TO KRISTIAN HALMRAST, OF SÖNDRE LAND, NORWAY.

MEANS FOR REMOVING GRASS FROM MOWER-KNIVES.

1,191,147.      Specification of Letters Patent.      Patented July 18, 1916.

Application filed March 26, 1915. Serial No. 17,111.

*To all whom it may concern:*

Be it known that I, HANS CHRISTIAN BJERING, a subject of the King of Norway, residing at Gjövik, Norway, have invented certain new and useful Improvements in Means for Removing Grass from Mower-Knives; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in mowers and the particular object of the invention is to provide means for preventing grass or the like from accumulating on the reciprocating knives of the mowers or between said knives and the fingers protecting the same.

In the following the invention shall be described in connection with a mower of the kind specified in U. S. Letters Patent No. 1089039, issued March 3, 1914, to Hans C. Bjering but it will be easily understood that the invention is also applicable on other types of mowers, where the grass may tend to accumulate and stick between the mowing knives and their protecting fingers or any other stationary part of the cutting machinery.

On the drawings, Figure 1 shows a vertical sectional view through the cutting apparatus of a mowing machine of the kind referred to. Fig. 2 is a plan of Fig. 1.

1 and 2 are the knives which are secured to the reciprocating bearers 3, 4.

Numeral 5 is a knife holder or frame; 6 is a protecting finger secured to said frame by means of bolt 7 and plate 8; 9 is the finger extension protecting the under side of the knives.

The particular form of the protecting finger here shown, which does not form a part of this invention has been designed particularly with a view to avoiding the sticking of grass in the cutting apparatus, but even with this improved construction grass, especially when it is wet will be liable to accumulate between the upper knife 2 and the finger 6, and this "dead" grass will then prevent the fresh grass from getting access to the knives. This drawback according to the present invention is avoided by riveting or otherwise securing on the side of the knife (the upper side) adjacent to the stationary finger a stud or projection 10, which coöperates with a projecting part 11 on the stationary finger 6, the reciprocation of the knife 2, carrying the stud or projection 10, causing the parts 10 and 11 to act like a pair of knives or scissors to cut off the "dead" grass accumulated upon the knives, whereupon the cut grass will be shaken off the knives or pushed away from the same by means of the said stud 10 and projection 11.

12 (Fig. 2) represents in dotted lines the rivet securing the stud 10 to the knife 2.

It will be understood that this invention can be applied equally well on mowers with underlying fingers or on mowers having only one reciprocating knife instead of two such knives; and also the details of construction may be considerably varied without departing from the spirit of the invention.

Claims.

1. In a mower, a knife holding frame, a reciprocable knife carried by said frame, a stationary protecting finger carried by said frame, and extending over said knife, a projection secured to said knife and extending up toward said stationary protecting finger, and a downwardly extending portion of said protecting finger coöperating with the projection on said knife during the reciprocating movement of said knife to remove grass accumulated between said knife and said protecting finger.

2. In a mower, a knife holding frame, a pair of reciprocable knives carried by said frame, a stationary protecting finger extending over said knives, a projection on the upper side of the upper knife, and a downwardly extending portion of said finger coöperating with the projection on said upper knife during the reciprocation of the latter to remove grass accumulating between said upper knife and said protecting finger.

In testimony that I claim the foregoing as my invention, I have signed my name in presence of two subscribing witnesses.

HANS CHRISTIAN BJERING.

Witnesses:
M. E. GUTTORMSEN,
C. FABRICIUS HANSEN.

Copies of this patent may be obtained for five cents each, by addressing the "Commissioner of Patents, Washington, D. C."